(12) United States Patent
Booth et al.

(10) Patent No.: US 8,236,418 B2
(45) Date of Patent: Aug. 7, 2012

(54) METHODS AND SYSTEMS FOR FABRICATING FIRE RETARDANT MATERIALS

(75) Inventors: Richard Benton Booth, Pflugerville, TX (US); Bruce Cary Thornton, Katy, TX (US); Donald Lewis Vanelli, Temple, TX (US); Martha Leigh Gardiner, Belton, TX (US)

(73) Assignee: The Boeing Company, Chicago, IL (US)

( * ) Notice: Subject to any disclaimer, the term of this patent is extended or adjusted under 35 U.S.C. 154(b) by 191 days.

(21) Appl. No.: 12/560,787

(22) Filed: Sep. 16, 2009

(65) Prior Publication Data

US 2010/0255327 A1    Oct. 7, 2010

Related U.S. Application Data

(63) Continuation of application No. 11/691,258, filed on Mar. 26, 2007, now abandoned.

(60) Provisional application No. 60/871,374, filed on Dec. 21, 2006.

(51) Int. Cl.
*B32B 5/66* (2006.01)

(52) U.S. Cl. ............. 428/402; 428/323; 428/474.4; 428/474.7; 428/475.8; 427/189; 524/469

(58) Field of Classification Search .......... 524/469; 428/474.4, 474.7, 475.8, 323, 402; 427/189
See application file for complete search history.

(56) References Cited

U.S. PATENT DOCUMENTS

| | | | | |
|---|---|---|---|---|
| 3,982,053 A | * | 9/1976 | Mayer et al. | 427/148 |
| 4,247,450 A | * | 1/1981 | Cerny et al. | 524/432 |
| 4,447,572 A | * | 5/1984 | Scharf et al. | 524/371 |
| 4,758,465 A | * | 7/1988 | McKinney et al. | 442/139 |
| 4,788,244 A | * | 11/1988 | Nakahashi et al. | 524/469 |
| 5,053,447 A | * | 10/1991 | Hussain | 524/412 |
| 5,157,064 A | * | 10/1992 | Gijsman | 524/114 |
| 5,543,452 A | | 8/1996 | Nakahashi et al. | |
| 5,648,450 A | | 7/1997 | Dickens, Jr. et al. | |
| 5,674,972 A | * | 10/1997 | Wabeeke et al. | 528/310 |
| 5,733,497 A | | 3/1998 | McAlea et al. | |
| 5,977,233 A | * | 11/1999 | Dever et al. | 524/409 |
| 6,048,954 A | | 4/2000 | Barlow et al. | |
| 6,245,281 B1 | | 6/2001 | Scholten et al. | |
| 6,258,927 B1 | * | 7/2001 | Oka et al. | 528/310 |
| 6,350,802 B1 | * | 2/2002 | Martens et al. | 524/409 |
| 6,600,129 B2 | | 7/2003 | Shen et al. | |
| 6,676,892 B2 | | 1/2004 | Das et al. | |
| RE39,354 E | | 10/2006 | Dickens, Jr. et al. | |
| 7,135,525 B2 | | 11/2006 | Petter et al. | |
| 7,317,044 B2 | | 1/2008 | Monsheimer et al. | |
| 7,431,987 B2 | | 10/2008 | Pfeifer et al. | |
| 7,509,240 B2 | | 3/2009 | Das et al. | |
| 7,575,708 B2 | | 8/2009 | DeGrange et al. | |
| 2002/0086928 A1 | * | 7/2002 | Ouchi | 524/409 |
| 2004/0021256 A1 | | 2/2004 | DeGrange et al. | |
| 2004/0056022 A1 | | 3/2004 | Meiners et al. | |
| 2005/0191200 A1 | | 9/2005 | Canzona et al. | |
| 2006/0041041 A1 | | 2/2006 | Douais et al. | |
| 2006/0159896 A1 | | 7/2006 | Pfeifer et al. | |
| 2006/0198916 A1 | | 9/2006 | Beeck et al. | |

FOREIGN PATENT DOCUMENTS

| | | |
|---|---|---|
| EP | 1479728 A1 | 11/2004 |
| FR | 2198978 A | 4/1974 |
| WO | 0198398 A1 | 12/2001 |

OTHER PUBLICATIONS

International Search Report and Written Opinion of PCT/US2007/088050; Oct. 15, 2008; 16 pages.

* cited by examiner

*Primary Examiner* — Leszek Kiliman

(74) *Attorney, Agent, or Firm* — Armstrong Teasdale LLP

(57) ABSTRACT

A fire retardant material is described that includes a polyamide and a brominated hydrocarbon. The brominated hydrocarbon makes up between about two percent and about 25 percent of the fire retardant material.

20 Claims, 2 Drawing Sheets

METHODS AND SYSTEMS FOR FABRICATING FIRE RETARDANT MATERIALS

CROSS REFERENCE TO RELATED APPLICATIONS

This application is a continuation application of application Ser. No. 11/691,258, filed Mar. 26, 2007 now abandoned, which claims the benefit of Provisional Patent application Ser. No. 60/871,374, filed Dec. 21, 2006, which is hereby incorporated by reference in its entirety.

BACKGROUND OF THE INVENTION

This invention relates generally to material fabrication, and more specifically, to methods and systems for fabricating fire retardant materials. Particularly the methods generally describe solid freeform fabrication of three-dimensional objects, specifically materials and techniques for forming these three dimensional objects.

Selective laser sintering (SLS) is a process for generating a material from a powdered compound. In the SLS process, the powdered compound is distributed onto a surface, and a device, such as a laser, is directed onto at least a portion of the powder, fusing those powder particles together to form a portion of a sintered material. Successive layers of the powder are distributed onto the surface, and the laser sintering process continues, fusing both the particles of the powdered material together into layers and the adjacent layers together, until the fused layers of laser sintered material are of a shape and thickness as appropriate for the intended use of the material.

However, these materials have all been lacking in at least one dimension with respect to a flame retardant application. Typical parameters when assessing such materials include one or more of tensile strength, elongation at break, resistance to 12 and 60 second burn tests, production of smoke while burning, and ability of the material to self-extinguish when removed from a flame environment.

BRIEF DESCRIPTION OF THE INVENTION

In one aspect, a fire retardant material is provided that comprises a polyamide and a brominated hydrocarbon. The brominated hydrocarbon comprises between about two percent and about 25 percent of the fire retardant material.

In another aspect, a method for forming an object of flame retardant material is provided. The method comprises applying a first layer of a powder mixture of a polyamide and a brominated hydrocarbon to a surface, directing energy onto at least a first portion of the first layer such that at least the first portion of the first layer of the powder mixture is fused to form a first cross-section of the object, and successively applying additional layers of the powder mixture and directing energy to form successive cross-sections of the object, the directed energy also fusing adjacent layers of the cross-sections.

In still another aspect, an object formed from a fire retardant material is provided. At least one area of the object comprises a plurality of selectively laser sintered cross-sectional layers of a mixture of a polyamide and a brominated hydrocarbon.

DETAILED DESCRIPTION OF THE INVENTION

A method for fabricating fire retardant parts has been developed using a selective laser sintering (SLS) process. Also described is a material that results from the SLS process. The resulting product includes a brominated organic compound, for example a brominated hydrocarbon compound powder mixed with a nylon 11 (sometimes referred to as a polyamide-11) powder to fabricate parts using one or both of the SLS process and a roto-molding processes. This fabrication process allows functional fire retardant parts to be made while still maintaining the mechanical properties needed for aerospace and other functional uses. Previous attempts to make fire retardant parts has resulted in either an inability to process the powders in the SLS process or in degraded mechanical properties of the fabricated parts.

Figure 1:
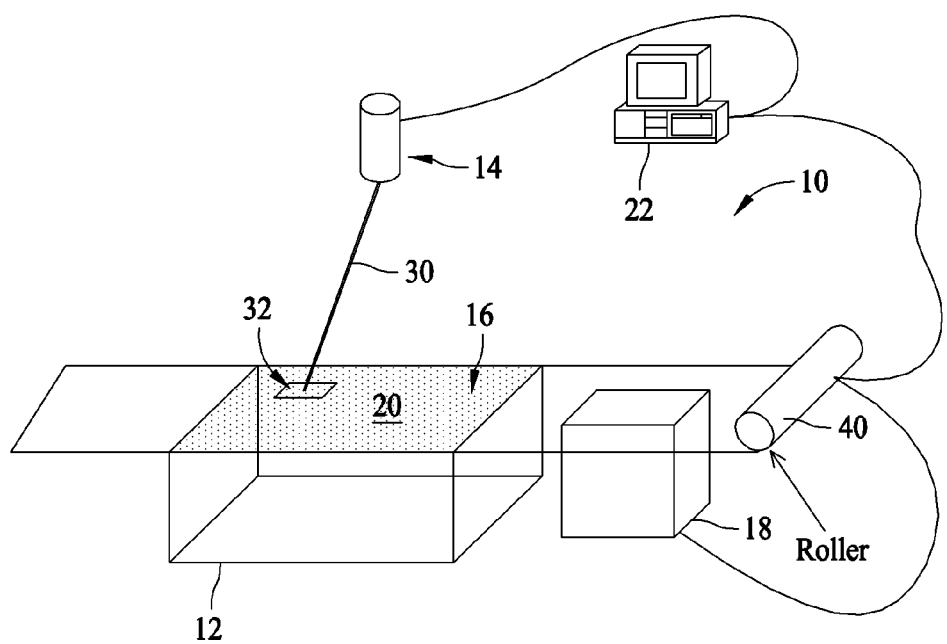
FIG. 1 is a depiction of a system for forming objects from powder materials.

FIG. 1 is a depiction of a system 10 for forming objects from the above described powder combination. In the illustrated embodiment, system 10 includes a part bed 12, a mechanism 14 for directing energy onto a surface 16 of part bed 12, a mechanism 18 for feeding powder 20 onto part bed surface 16, and a computer 22 for controlling the operation of system 10.

In an example embodiment of system 10, part bed surface 16 is maintained at a specific temperature and mechanism 14 is a $CO_2$ laser that is configured to direct energy 30 onto part bed surface 16. The directed energy 30 elevates the temperature of a cross-sectional region 32 of powder 20 that it impinges to a temperature where the powder 20 in the cross-sectional region 32 softens and fuses together, forming a first layer of an object. Multiple cross section regions in the same layer may be fused in this manner. The part bed surface 16 is then lowered while a cartridge of feed powder is raised to allow a roller 40 to push a new layer of non-fused powder onto the part bed surface 16 and the first layer of fused particles. The process is repeated until a desired shape is formed. At such a point, the part bed volume is removed from system 10 and any non-fused powder is separated from the fused objects which were formed by the directed energy of mechanism 14 (e.g., the $CO_2$ laser).

The process of fusing the powder 20 in layers as described above is sometimes referred to as selective laser sintering (SLS). Specifically, the SLS process is utilized to build one or more desired three-dimensional objects by fusing a series of thin layers of material, in one embodiment, less than 0.010 inches per layer, which is often in the form of powder. To the extent that the system 10 does not incorporate a portion of the powdered material into the object being formed, such material nevertheless operates to support the object during its formation and may, in some cases, be available for reuse in the process of forming other objects or another portion of the object being formed.

More specifically, during the build process, the system 10 distributes a first layer of powdered material across a surface (e.g., part bed surface 16) of a build chamber of system 10. A portion of the powdered material 20 is fused together at selected locations by directing energy from mechanism 14 to selected regions of the layer of powdered material. This region of fused material is the first section of the item being fabricated. The surface 16 of the build chamber is then lowered by the thickness of a subsequent layer which is then spread across the build chamber surface 16 and any fused material thereon. The directed energy then fuses a region of this second layer and also fuses this second layer to the first. Additional layers of powder are added to the build chamber until the final part has been constructed from the multiple fused layers.

More particularly in regard to one embodiment of system 10, part bed 12 includes an oxygen-controlled cabinet or chamber, mechanism 18 includes a feed container for powder, and the build chamber surface 16 includes a platform that can be accurately lowered and raised. As described above, mechanism 14 typically includes a directed energy beam that can be moved to different areas of build chamber surface 16, for example, an infrared laser. Computer 22 is configured to process build information for individual layers of powder that are fused to provide the desired part. Providing the desired part further necessitates utilizing a powder material with proper particle size distribution and a mechanism (e.g., roller 40) to repeatedly spread the powder into smooth layers. Part bed 12 also incorporates heaters (not shown in FIG. 1) in multiple zones for accurate temperature control of the powder feeds and part bed surface 16.

As described above, powder 20 is fed to the build chamber surface 16 from a powder feed container (e.g., mechanism 18) and roller 40 or another type of spreader causes the powder to be in a smooth layer as it enters build chamber surface 16. Mechanism 14 (e.g., the laser) melts or softens the powder layer in the desired pattern. In a first embodiment, the system 10 forms a fused cross-section of the object, irrespective of whether a complete melt occurs. For example, the fusion is achieved by softening the outside regions of powder particles so that they will in turn 'stick' or fuse to adjacent particles.

Figure 2:
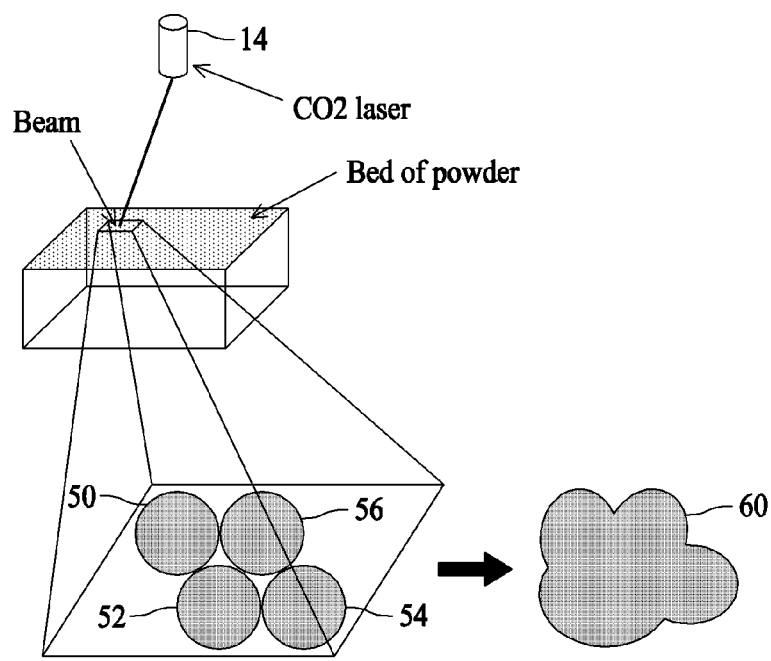
FIG. 2 is illustrates a selective laser sintering process.

FIG. 2 is illustrative of this fusing, or sintering, process, where individual particles 50, 52, 54, and 56 of material are sintered together to form a portion 60 of an object. It is to be understood that the beam energy from the CO2 laser (e.g., mechanism 14) in this illustrative example does not have to melt the powder particles (50, 52, 54, and 56) entirely, it only has to partially melt the surfaces or soften the surfaces of the powder particles (50, 52, 54, and 56) to result in a fusion of these particles together into an object. System 10 moves the build chamber surface 16 a specified distance as programmed into computer 22. Roller 40 of system 10 pushes a layer of powder from the top of the powder feed container on to the build chamber surface 16.

System 10 adds successive layers of the powder according to the instructions from the computer 22 or operator. During SLS processing, a number of material/process interactions can occur. For example, when rolled onto the build area (e.g., part bed surface 16), the powder may contain void areas between the particles. When the system 10 melts the particles, particle volume is reduced filling in these void spaces. Typical materials shrink further as they go from a liquid to a solid state. Typically the first melted layers are the first to re-solidify and the resulting stress from differential re-solidification causes the part to warp or "curl". System 10 is configured to use temperature and heat balance controls to keep all the layers of the part being built very close to the re-solidification temperature of the powder material. If the system 10 cools the melted layers too fast, the part will warp or curl as the bottom layers go from melted liquid to solid. If the system 10 applies too much heat or temperature to the sintered cross-sections, then the powder next to the part outer wall will soften also leading to poor part definition and accuracy.

As a result, system 10 controls the temperature of the part bed and the added energy from the laser to keep from melting adjacent powder, yet also to allow slow cooling of the melted layers to prevent "curl". High powder temperature in the system 10 will cause the non-sintered regions of powder to become tacky and difficult to break down and remove from the surfaces of the sintered objects upon completion of the system 10 sintering process. Additionally, system 10 applies sufficient energy to each sintered cross section to allow good adhesion to the previously softened cross-section, without introducing deformation of the part from excessive melting of adjacent powder to the cross-sectional areas being softened. Preferably, the system 10 uses powder materials that have a difference between the melt temperature and the recrystallization temperature to precisely form objects with good surface detail and an absence of curl.

Compared to other materials processing industries (injection molding for example), few materials have been developed that can be used by systems similar to system 10 with acceptable accuracy and without curl or other deformation occurring in the final object. Therefore, a material for use in system 10 is herein described to produce parts that, in addition to desired curl and deformation properties, also have advantageous fire retardant properties. Typical properties of importance in a fire retardant material for use in the SLS process are tensile strength, elongation at break, resistance to 12 and 60 second burn tests, production of smoke while burning, and ability of the material to self-extinguish when removed from a flame environment.

Some materials typically used in the SLS process are nylon-11 and nylon-12, these two materials, along with other materials that may or may not be mentioned herein are collectively referred to as polyamides. Respectively, nylon-11 is an example of a polyamide-11 and nylon-12 is an example of a polyamide-12. One embodiment of the nylon-12 material referenced herein is provided by 3D Systems Corporation of California, United States and is a sintering powder produced by Degussa Gmbh of Germany. The trade name for such nylon-12 material is Duraform LS. A similar nylon-12 material is marketed by EOS Gmbh of Germany as EOS PA2200. When used in the system 10 process to produce sintered objects, mechanical properties of 6400 psi ultimate tensile strength and 9% elongation at break by ASTM 638 standards are typical for the Duraform LS material. The nylon-11 material will be further described below.

Polymers, and in particular nylon polymers, are typically fire retarded through the dispersion of various fire retarding compounds into the base polymer system. The dispersion can be accomplished through a variety of well known techniques such as dry mixing or compounding. Some typical fire retardant approaches in polymers involve formulating compounds to reduce the heat release rate of the material (by initiating heat adsorbing reactions), forming a protective layer of char at the burn surface, or dilution of radicals through the release of $CO_2$ or $H_2O$.

Of particular importance in the selective laser sintering process is the ability of the material used in system 10 to melt and flow sufficiently to form a dense or near fully dense part to achieve typically more desirable mechanical properties. The addition of fire retarding compounds, especially those with very high viscosity or melting temperatures, will typically tend to inhibit the overall flow ability of the composite material when subjected to the combination of system 10 temperature, and laser energy. This correspondingly will often result in a decrease in the density of the parts produced by the system 10 and thus a resulting lowering of their mechanical strength and ability to elongate under stress.

The material described herein, in one embodiment, comprises at least 70% by weight of nylon polymer materials and no more than 30% by weight of a brominated organic compound. Utilization of such a material results in advantages over known materials when fabricated using a system such as system 10. In particular, fire retardant attributes of the material are improved over the base polymer with a minimal loss of mechanical strength and elongation versus other typical fire retardant additives.

In one specific embodiment, a nylon-11 polymer in powder form is mixed with brominated hydrocarbons, or another brominated organic compound, to produce parts using system 10. One source of such nylon-11 powder is the RILSAN group of the Arkema Corporation of France. One specific powder is RILSAN D-80 Nylon-11. This powder has a d50 particle size of between 75 and 95 microns as measured by laser diffraction. The powder has a melting peak temperature of between 185 and 195 degrees Celsius as measured by differential scanning calorimetry at a rate of between 10 and 20 degrees Celsius per minute.

This nylon-11 powder, when processed by system 10 and not mixed with any brominated organic compounds, produces parts having approximately 7200 psi of ultimate tensile strength and 40% elongation at break according to ASTM 638 standards. When burned according to a vertical burn test described in Boeing Specification BSS 7230, parts produced by system 10 using the nylon-11 powder will ignite and will not self-extinguish, thus burning the entire testing sample in time.

However, when a brominated organic compound is dry mixed with this nylon-11 powder the end results are much improved. In one example, the weight percentage of the brominated organic compound was eleven percent. One example of such a brominated organic compound is FR 1025 produced by the ICL Industrial Products Corporation. This material is a poly (pentabromobenzyl) acrylate available in powder form.

Additional testing was done on 7% and 16% by weight mixtures of FR 1025 and RILSAN nylon-11 D-80 powder. Referring to Table 1 below, it will be noted the minimally degraded tensile strength and elongation at break properties of parts fabricated using the system 10. Fire retardant test data according to BSS 7230 is also presented below for a 60 second burn test. All materials self-extinguish when the flame is removed. In these embodiments, burn length samples were 0.045" thick and tested according to BSS 7230, and mechanical properties were tested according to ASTM 638.

TABLE 1

| weight content of FR 1025 | 7% | 11% | 16% |
|---|---|---|---|
| Ultimate tensile strength | 6675 psi | 6360 psi | 6040 psi |
| Elongation at break | 39% | 36% | 34% |
| Burn length average | 3.3 inches | 2.2 inches | 1.5 inches |
| Time to extinguish | 0 seconds | 0 seconds | 0 seconds |
| Drip time to extinguish | 0 seconds | 0 seconds | 0 seconds |

A further material composition was tested using RILSAN D-80 nylon-11 powder dry mixed with 11% by weight of a bis(tribromophenoxy)ethane produced by the Great Lakes Corporation of West Lafayette, Ind. (Great Lakes FF-680). Property data from this composition, which was 0.090" thick sample per BSS 7230, also showed significant advantage in the system 10 process for producing fire retardant parts in the area of minimally degraded mechanical properties and good flame retardant properties as shown in Table 2 below.

TABLE 2

| weight content of FR 680 | 11% |
|---|---|
| Ultimate tensile strength | 6040 psi |
| Elongation at break | 36% |

TABLE 2-continued

| Burn length average | 3.6 inches |
|---|---|
| Time to extinguish | 1.4 seconds |
| Drip time to extinguish | 0 seconds |

No appreciable difference in the use of system 10 to produce parts would be noticeable to those skilled in the art between the aforementioned materials. The removal of the unsintered powder from the sintered objects is of the same or not noticeably different difficulty in all cases. The surface finish showed no appreciable difference to one skilled in the art when compared to parts produced using 100% weight RILSAN D-80 nylon-11 powder. Testing conditions and geometries produced were held constant in all cases.

In still another embodiment, parts were produced using compounded formulations of the fire retarded nylon composition and the fabrication of objects using the method employed by system 10. In this case, RILSAN D-80 nylon-11 powder and FR 1025 powder were melted together, extruded into pellets and then cryogenically ground into a powder of average 100 micron particle size.

Two compositions were tested, as summarized in Table 3, one with seven percent weight content of FR 1025 and one with eleven percent weight content of FR 1025. In these embodiments, the burn length samples were 0.045" thick and tested according to BSS 7230, while the mechanical properties were tested according to ASTM 638.

TABLE 3

| weight content of FR 1025 | 7% | 11% |
|---|---|---|
| Ultimate tensile strength | 6220 psi | 6120 psi |
| Elongation at break | 29% | 24% |
| Burn length average | 3.3 inches | 2.2 inches |
| Time to extinguish | 0 seconds | 0 seconds |
| Drip time to extinguish | 0 seconds | 0 seconds |

Figure 3:
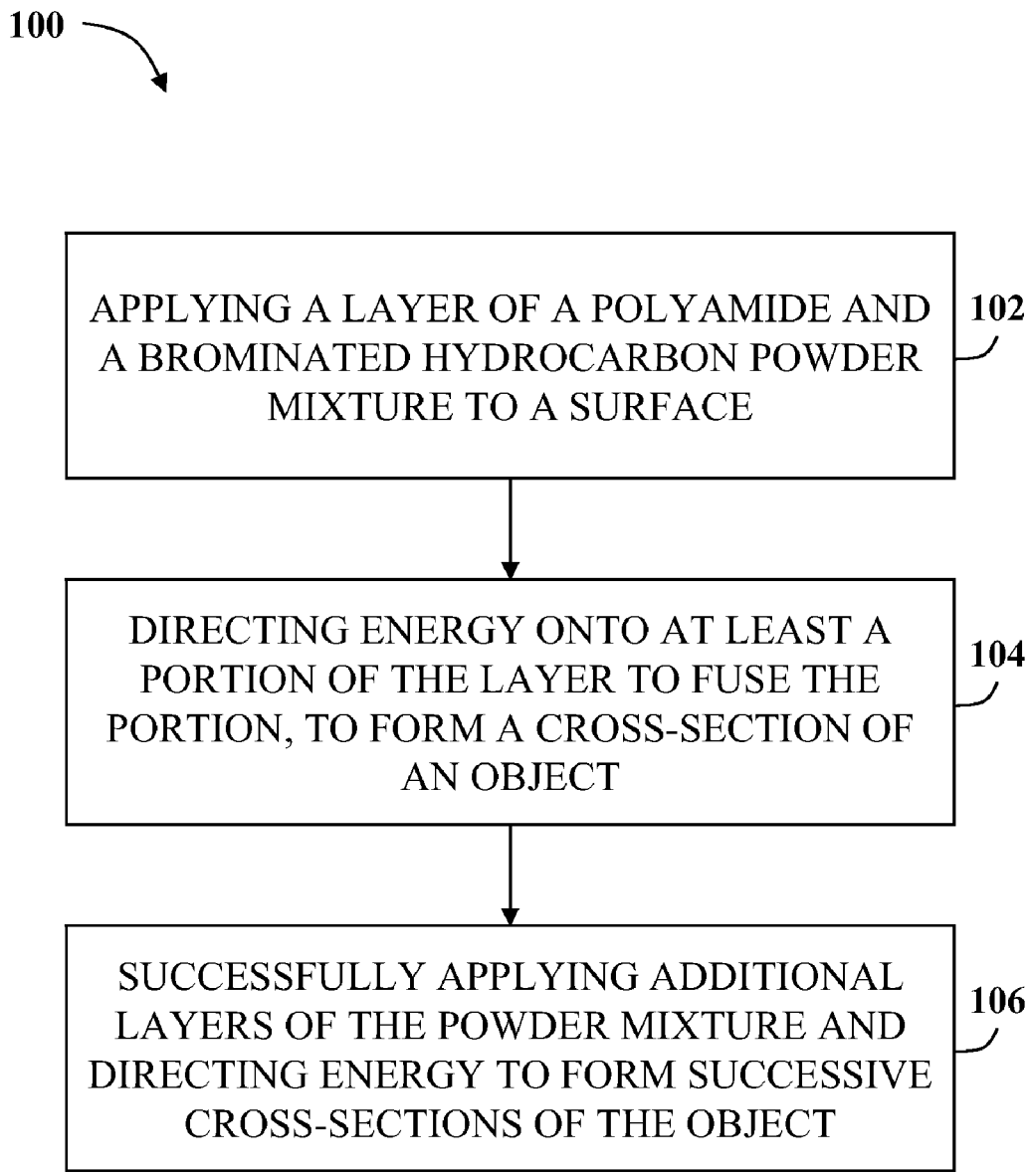
FIG. 3 is a flowchart describing a method for fabricating a flame retardant material.

The above described embodiments have also resulted in a method for producing a flame retardant material, as illustrated by the flowchart 100 of FIG. 3. Specifically, the method includes applying 102 a first layer of a powder mixture of a polyamide and a brominated organic compound to a surface, directing 104 energy onto at least a first portion of the first layer such that at least the first portion of the first layer of the powder mixture is fused to form a first cross-section of the object, and successively applying 106 additional layers of the powder mixture and directing energy to form successive cross-sections of the object. The directed energy also fusing adjacent layers of the cross-sections for the object being formed.

As described above, the polyamide includes at least one of a polyamide-11 and/or another polyamide and the brominated organic compound includes at least one of a polyacrylate and a bis-ethane. Based on the test results described above, such a mixture includes between about two and about 25 percent of the brominated organic compound, combined with the polyamide using the above described selective laser sintering process, in one embodiment.

In a specific embodiment of the method, the polyamide and the brominated organic compound are combined in a melting process, extruded as a compound, which is then pulverized, resulting in the polyamide and brominated organic compound powder mixture. In other embodiments, the polyamide and a brominated organic compound are combined in a dry blending process or particles of the polyamide are coated with particles of the brominated organic compound.

Other compositions, objects, and methods for the production products having similar properties, using system 10 process or another similar process are contemplated, including other brominated organic compounds, included at varying weight percentages as mixed with nylon powders. Further utilization of these varying materials and weights are contemplated as either individual ingredients combined within system 10 are previously combined into a compound as described above.

While the invention has been described in terms of various specific embodiments, those skilled in the art will recognize that the invention can be practiced with modification within the spirit and scope of the claims.

What is claimed is:

1. A fire retardant device comprising:
plurality of layers formed through selective laser sintering of a powder compound, each said layer comprising a sintered, selected cross-section of the powdered compound, each said layer comprising a polyamide and a brominated organic compound, the brominated organic compound comprising between about two percent and about 25 percent by weight of the powder compound, wherein said polyamide and said brominated organic compound each comprise a powder compound combined through the selective laser sintering.

2. A fire retardant device according to claim 1 wherein said brominated organic compound comprises between about seven and about sixteen percent of said device.

3. A fire retardant device according to claim 1 wherein said polyamide comprises one of polyamide-11 and polyamide-12.

4. A fire retardant device according to claim 1 wherein said brominated organic compound comprises one or more of a poly-acrylate and a bis-ethane.

5. A fire retardant device according to claim 1 wherein said brominated organic compound comprises a poly-acrylate which comprises pentabromobenzyl.

6. A fire retardant device according to claim 1 wherein said brominated organic compound comprises a bis-ethane which comprises tribromophenoxy.

7. A fire retardant device according to claim 1 wherein said polyamide and said brominated organic compound are combined in a melting process, and extruded as a compound, the compound pulverized into a powder and subjected to the selective laser sintering process.

8. A fire retardant device according to claim 1 wherein said brominated organic compound comprises a brominated hydrocarbon.

9. A fire retardant device according to claim 1 wherein said polyamide and said brominated organic compound are combined in a dry blending process.

10. A fire retardant device according to claim 1 wherein said polyamide and said brominated organic compound are combined by coating particles of said polyamide with particles of said brominated organic compound.

11. An object formed from a fire retardant material, at least one area of said object comprising;
a plurality of selectively laser sintered cross-sectional layers formed through selective laser sintering of a powder compound, each of the plurality of layers comprising a sintered, selected cross-section of the powdered compound, each of the plurality of layers further comprising a mixture of a polyamide and a brominated organic compound, the brominated organic compound comprising between about two percent and about 25 percent by weight of the powder compound, wherein said polyamide and said brominated organic compound each comprise a powder compound combined through the selective laser sintering.

12. An object according to claim 11 wherein the mixture of the polyamide and the brominated organic compound comprises between about seven percent and about sixteen percent of the brominated organic compound.

13. An object according to claim 11 wherein said cross-sectional layers adjacent to one another are fused to one another in the selective laser sintering process.

14. An object according to claim 11 wherein the polyamide comprises at least one of a polyamide-11 material and a polyamide-12 material.

15. An object according to claim 11 wherein the brominated organic compound comprises a poly-acrylate.

16. An object according to claim 15 wherein the poly-acrylate comprises pentabromobenzyl.

17. An object according to claim 11 wherein the brominated organic compound comprises a bis-ethane.

18. An object according to claim 17 wherein the bis-ethane comprises tribromophenoxy.

19. An object according to claim 11 wherein the polyamide and the brominated organic compound are combined using a dry blending process.

20. An object according to claim 11 wherein the polyamide and the brominated organic compound are combined by coating particles of the polyamide with particles of the brominated organic compound.

* * * * *